United States Patent
Quinn et al.

(10) Patent No.: US 11,361,354 B2
(45) Date of Patent: Jun. 14, 2022

(54) METHOD, COMPUTER-READABLE NON-TRANSITORY STORAGE MEDIA, AND SYSTEM FOR DISTRIBUTING AND UPDATING PRODUCT CATALOGS TO WIRELESS DEVICES

(71) Applicant: Swiftly Systems, Inc., Millbrae, CA (US)

(72) Inventors: David Thomas Quinn, Seattle, WA (US); Shawn Michael Murphy, Seattle, WA (US); Benjamin Travis Stull, Seattle, WA (US); Sean Edward Turner, Seattle, WA (US)

(73) Assignee: Swiftly Systems, Inc., Millbrae, CA (US)

( * ) Notice: Subject to any disclaimer, the term of this patent is extended or adjusted under 35 U.S.C. 154(b) by 0 days.

(21) Appl. No.: 16/859,658

(22) Filed: Apr. 27, 2020

(65) Prior Publication Data
US 2021/0334871 A1 Oct. 28, 2021

(51) Int. Cl.
*G06Q 30/00* (2012.01)
*G06Q 30/06* (2012.01)

(52) U.S. Cl.
CPC ..... *G06Q 30/0623* (2013.01); *G06Q 30/0603* (2013.01)

(58) Field of Classification Search
CPC . G06Q 30/0601–0645; G06Q 30/0603; G06Q 30/0623
(Continued)

(56) References Cited

U.S. PATENT DOCUMENTS 8,924,510 B1 * 12/2014 Preston ................. G06F 16/435
709/217
8,930,318 B1 * 1/2015 Petkov ................ G06F 11/1423
707/649
(Continued)

FOREIGN PATENT DOCUMENTS

AU 2014348888 B2 * 8/2017 ......... G06Q 30/0603
JP 2016184400 A 10/2016

OTHER PUBLICATIONS

Smith, Grace. "13 content delivery networks to speed up your website" (2018) Mashable.com (Year: 2018).*
(Continued)

*Primary Examiner* — Allison G Wood
*Assistant Examiner* — Katherine A Barlow
(74) *Attorney, Agent, or Firm* — Baker Botts L.L.P.

(57) ABSTRACT

Described herein are techniques for efficiently upgrading product information stored on a client device to the latest version that reflects the current products offered by a particular establishment. Product information changes frequently, which could result in large upgrade packages. Yet, the time available for downloading the packages onto a device may be severely limited. To improve download time, upgrade packages may be shard based on product commonality within different predefined scopes. For instance, information related to products common across chain-wide establishments may be upgraded using one set of upgrade packages, and information related to products common across region-wide establishments may be upgraded using another set. This upgrade framework helps reduce file size and leverage the edge-caching capabilities of content delivery networks to reduce the time needed to transmit upgrade packages to client devices.

12 Claims, 11 Drawing Sheets

(58) Field of Classification Search
USPC .................................. 705/26.1–27.2, 26.61
See application file for complete search history.

(56) References Cited

U.S. PATENT DOCUMENTS

| | | | |
|---|---|---|---|
| 9,292,521 | B1 | 3/2016 | Goo |
| 9,471,098 | B2 | 10/2016 | Charlton |
| 10,028,117 | B1* | 7/2018 | Ben Haim .............. H04W 4/60 |
| 10,115,141 | B1* | 10/2018 | Warman .............. H04L 63/0281 |
| 10,225,145 | B2 | 3/2019 | Feng |
| 2003/0149581 | A1* | 8/2003 | Chaudhri ............... G06Q 30/06 |
| | | | 705/26.1 |
| 2006/0130037 | A1 | 6/2006 | Mackay |
| 2012/0316989 | A1* | 12/2012 | Wong ................. G06Q 30/0601 |
| | | | 705/26.9 |
| 2017/0098266 | A1* | 4/2017 | Taylor ................ G06Q 30/0625 |

OTHER PUBLICATIONS

Lawler, Ryan. "Netflix Rolls Out Its Own CDN: Open Connect" (2012) TechCrunch.com (Year: 2012).*

Zolfaghari, Behrouz et al. "Content Delivery Networks: State of the Art, Trends, and Future Roadmap." Apr. 17, 2020. ACM Computing Surveys, vol. 53, No. 2, Article 34. doi.org/10.1145/3380613 (Year: 2020).*

International Search Report and Written Opinion for International Application No. PCT/US2021/028001, 11 pages, dated Aug. 6, 2021.

* cited by examiner

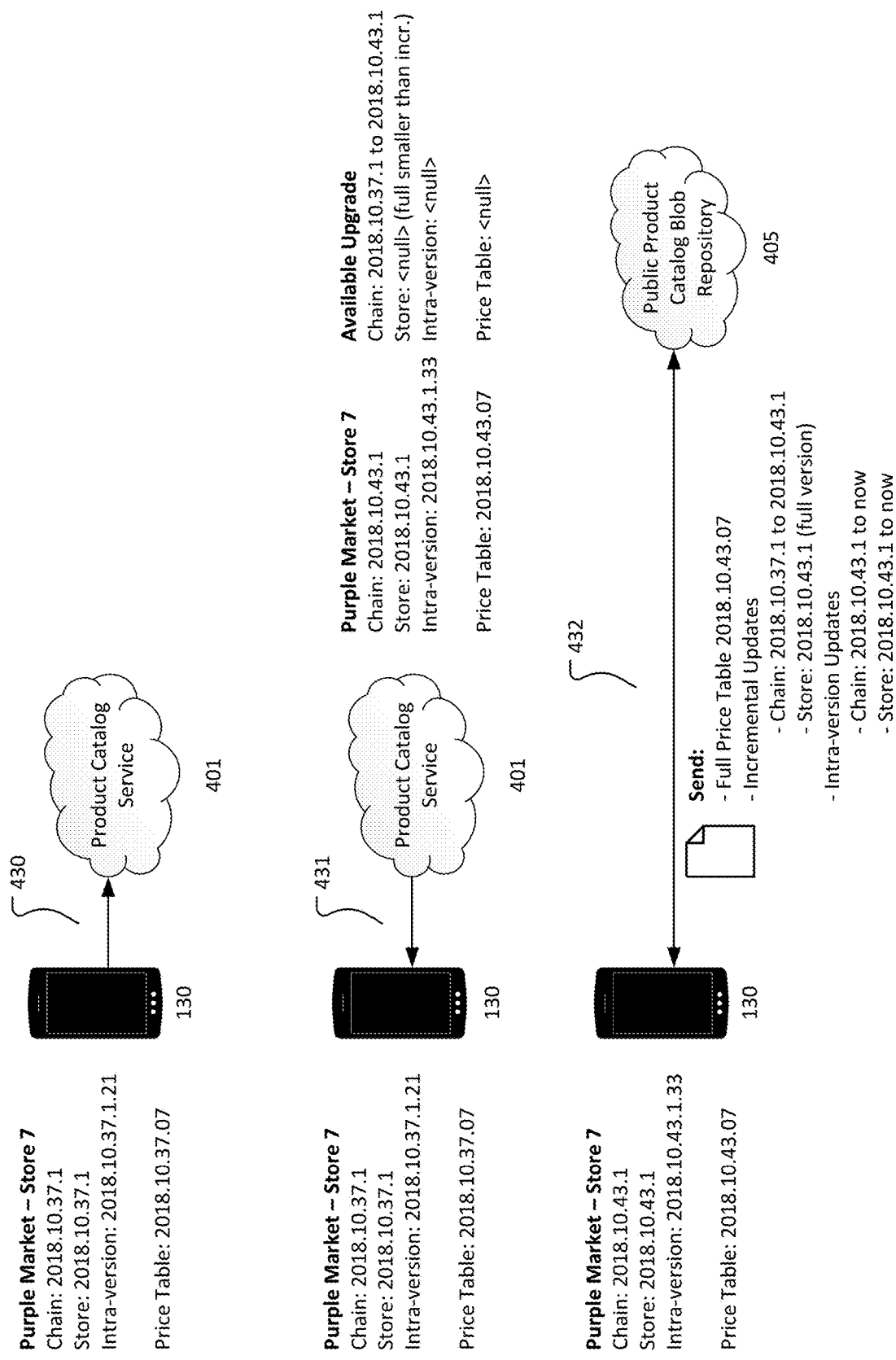

METHOD, COMPUTER-READABLE NON-TRANSITORY STORAGE MEDIA, AND SYSTEM FOR DISTRIBUTING AND UPDATING PRODUCT CATALOGS TO WIRELESS DEVICES

TECHNICAL FIELD

This disclosure generally relates to wireless content distribution.

BACKGROUND

Grocery stores and supermarkets became a staple of consumer culture, as large quantities and varieties of food became widely available for purchase in one convenient location. Modern grocery stores provide a unique outlet for consumers, as they expand beyond food to oftentimes include thousands of products, ranging from household goods, cosmetics, hardware, and pet supplies which are consolidated and available for purchase in one convenient location. The traditional grocery store permits users to enter, collect any quantity of items, and proceed to purchase their items at a counter or checkout with the assistance of a cashier. The importance of grocery stores in consumer culture required that stores be located in a convenient location for consumers; thus grocery stores have been constructed in both urban and rural areas, and in buildings of varying size and quality.

BRIEF DESCRIPTION OF THE DRAWINGS

FIGS. 4A, 4B, and 4C illustrate various catalog upgrade scenarios.

DESCRIPTION OF EXAMPLE EMBODIMENTS

Figure 1:
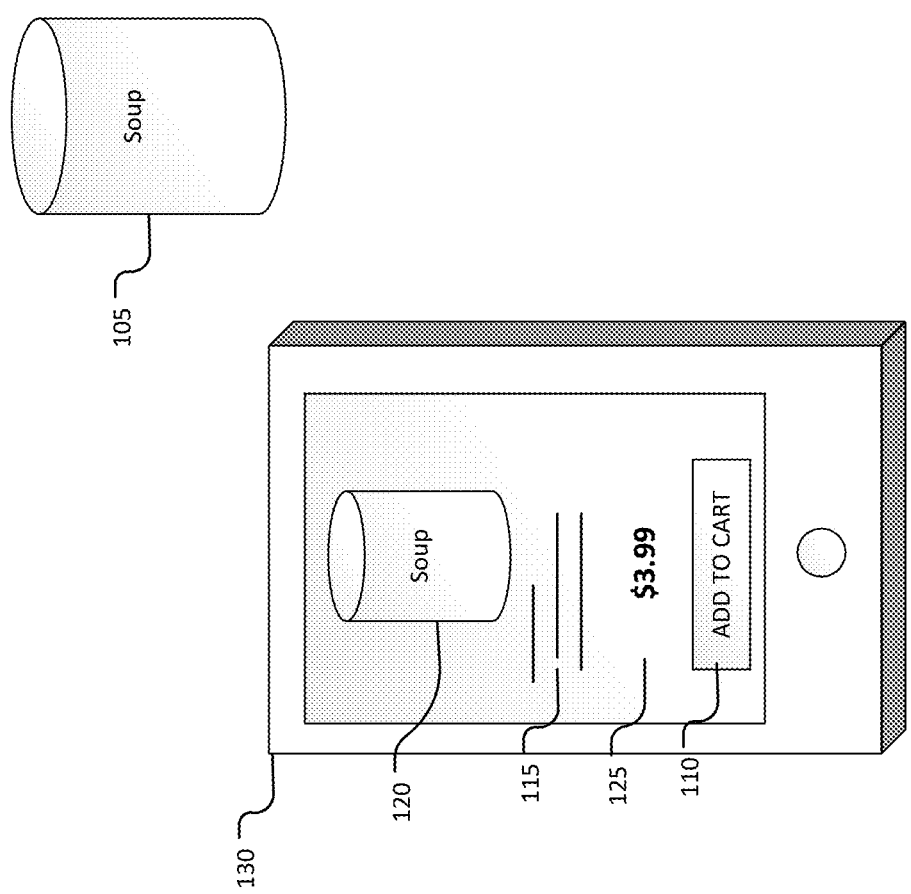
FIG. 1 illustrates an example wireframe of a GUI of a client system at a particular location.

Particular embodiments described herein relate to an application-based shopping and checkout feature that improves a user's shopping experience at brick-and-mortar stores. For example, a user who is at a store looking at a product may be able to use an application on his mobile device to find relevant information associated with that product. FIG. 1 illustrates an example wireframe of a GUI of a client device 130 at a particular store that includes an example of product information. For example, a user at a grocery store may be interested in a can of soup 105. The user may use a mobile application running on client device 130 to identify the can of soup 105 (e.g., by browsing or searching through a database, scanning the barcode on the product, or using computer-vision techniques to identify the product). The mobile application may display product information related to the can of soup 105, including a product description 115, product image 120, product price 125. Although not shown, the information presented or made available to the user is not limited to the above information and may contain any additional information related to, for example, stock-keeping unit (SKU) information, ingredients, availability, location within the store, allergy information, other identifying information, user reviews and rating, and any other relevant information. The user may also add the product to his virtual shopping cart using the user interface 110 (e.g., a button, checkbox, etc.). The user may pay for the products in his virtual shopping cart in lieu of paying at the store's kiosk or with the cashier. This way, the user could simply take the products, pay using his mobile device, and walk out of the store without ever having to wait in line and go through the traditional manual checkout process. However, if the user is unable to download the latest product information, he would be unable to take advantage of the intended mobile-shopping experience offered by the store.

Challenges with network connectivity within brick-and-mortar stores (e.g., grocery stores, sports equipment stores, electronics stores, clothing stores, etc.) present a problem for mobile applications seeking to provide up-to-date information on store products, as an inventory of items and associated descriptions and prices within a store may fluctuate on a weekly, daily, or even hourly basis. Thus, in order to provide a satisfying mobile-shopping experience to consumers while the user is physically present at brick-and-mortar stores, the database of products within the mobile application must be up-to-date to ensure users are presented with accurate and up-to-date information. For example, as a user walks through the aisles of a grocery store, he may see a box of cookies.

Brick-and-mortar stores and their mobile applications have struggled with providing timely updates due to network connectivity issues within stores, the frequency of product changes, and the overall size of a typical store inventory (especially grocery stores). A typical store may include thousands of items for purchase, which result in large update files that require a significant amount of time, bandwidth, and storage requirements on the client device to provide the user with up-to-date content via a mobile application. Despite the perception that the internet is widely available in urban environments, grocery and retail stores often have poor, spotty, or inconsistent cellular and/or wi-fi network availability. These connectivity issues are often caused by the unique built environment of stores (e.g., thick concrete or masonry walls with few openings, high density steel shelving, steel roofing, etc.).

Stores may attempt to solve this problem through a variety of methods, including in-store wifi, cellular repeaters, and offline modes for the mobile application. However, these methods all suffer from being expensive, impractical, or reducing the functionality of the mobile application and overall user experience. In-store wifi often lacks the bandwidth, deployment frequency, or IT management required for every shopper to have a reasonable connection quality, throughput, or ease of connection. Cellular signal repeaters have high costs to acquire, deploy, and configure. "Offline" database synch engines would need reliable network connections in order to download all the changes since the user's last update, which would result in a lot of duplicate traffic.

Particular embodiments herein describe a method to provide content updates to client devices via upgrade packages in order to improve and expedite the shopping experience on a mobile application through a client device. Instead of transmitting full updates to a client device every time the inventory of an establishment changes, the present invention seeks to provide incremental upgrade packages associated with certain subsets of products associated with certain subsets of establishments. This usually results in incremental upgrade packages that are smaller in size and thus can be quickly delivered to client devices.

Moreover, as will be described in further detail below, the incremental upgrade packages are designed so that each client device may selectively download a particular upgrade package that is suitable for upgrading its locally-stored product information to the latest version. Since different client devices may have different versions of the product information stored (e.g., one device may have version 5 and another device may have version 7 installed), providing different levels of upgrades reduces unnecessary network traffic. For example, a store providing a single upgrade package to accommodate any supported version of the product information would need to have that upgrade package include more information than necessary for some of the versions (e.g., newer versions might need fewer updates than older version). Such one-size-fits-all approach would usually lead to inefficiency and network congestion. Thus, providing a variety of incremental download packages for devices with different versions of product information improves upgrade efficiency.

Another benefit of providing incremental download packages is that the finite number of available packages allows content delivery services to utilize edge caching to improve delivery performance. To illustrates, one option for providing custom upgrade packages is to determine what information is lacking on a particular device and generate a custom upgrade package for that particular device. However, such a custom upgrade package would need to be created for every requesting device, which means that edge-caching would not be feasible. By providing incremental upgrade packages according to embodiments described herein, the same packages could provide the needed information for multiple devices. This allows the delivery of incremental download packages to leverage edge-caching and other optimization technologies provided by content delivery networks.

In particular embodiments, an enterprise computing system may be configured to provide product information upgrades to users as needed. The enterprise computing system may be associated with any number of physical establishments. For example, the enterprise computing system may support all the grocery stores belonging to a chain. The stores in the chain may be distributed across different geographic regions (e.g., a hundred stores may be distributed across the United States, with some in California, some in Florida, etc.), and some of the stores may form clusters (e.g., stores near the California-Nevada border may carry similar goods).

Figure 2:
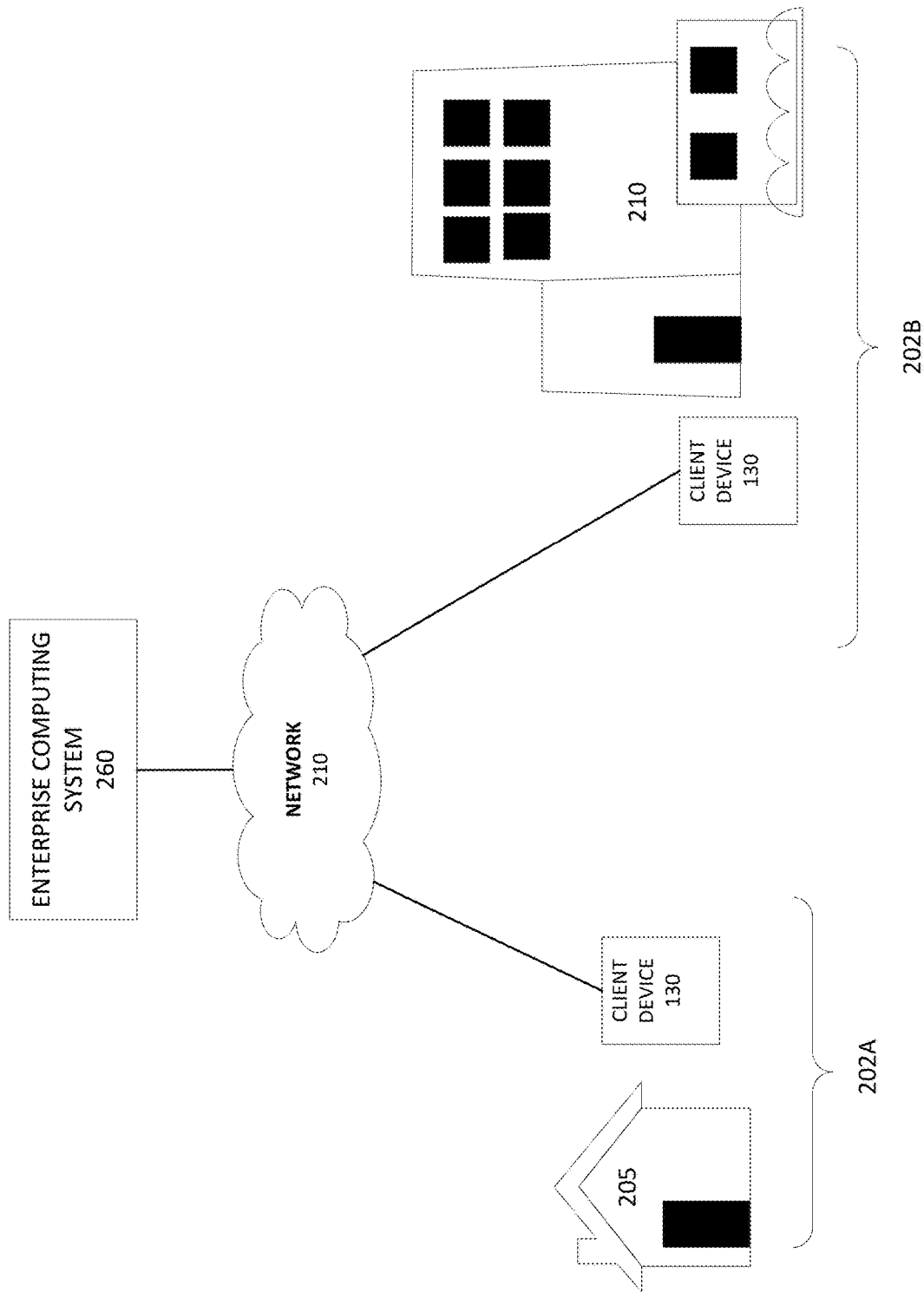
FIG. 2 illustrates a computing system providing product information to a client device through a network

FIG. 2 illustrates an enterprise computing system 260 providing product information to a client device 130 through a network 210. In some embodiments, client device 130 may request updated product information from the enterprise computing system 260. The particular information requested may depend on which brick-and-mortar store the user intends to visit or is likely to visit. For example and not by way of limitation, in environment 202A, client device 130 is located at residential domicile 205 and thus not near establishment 210. In environment 202A, client device 130 initiates the request based on an action by the user through a mobile application associated with the enterprise computing system 260. Alternatively, the mobile application may automatically request for updates since network connection is available. When the enterprise computing system 260 receives the request, which may include an ID of the user, the system 260 may determine which establishment is of interest or likely to be of interest to the user. For example, the request from the client device 130 may explicitly specify a particular establishment of interest (e.g., the user may select a particular establishment from a list of establishments). The system 260 may also determine which establishment is likely to be of interest to the user based on saved user preferences (e.g., the user may have specified a default or preferred establishment), past visits (e.g., the system 260 may determine that the user typically visits a particular establishment), or proximity to the closest establishment. In response to the determination, the system 260 may proceed with providing the upgrade package to the client device 130, as will be described in further detail below.

In another embodiment, client device 130 may be in environment 202B and located near establishment 210. Client device 130 may initiate the request based on the location of the client device relative to establishment 210. For example, as the user drives or walks towards the establishment 210, the client device 130 or the enterprise computing system 260 may determine that the user is likely interested in visiting establishment 210 (e.g., the device's GPS data may be used to determine that the user is moving towards the establishment 210). As another example, the client device 130 or the enterprise computing system 260 may determine that the client device 130 is within a threshold distance from the establishment 210 and conclude that the user is likely going to visit the establishment 210. Once it is determined that the user intends to visit or is likely to visit the establishment 210, the process for updating the product information stored on the client device 130 may commence. Ideally, this process is initiated before the client device 130 enters the establishment 210 so that the upgrade process can complete before the client device 130 potentially loses connectivity with network 210 (e.g., due to the physical structure of the establishment 210). Thus, the amount of time available for sending the upgrade package to the client device 130 may be limited. Especially with certain types of establishments (e.g., grocery) that have a large number of products, it would be a challenge to download all the product information onto the client device 130 within the time limit.

To provide upgrade packages to individual devices efficiently, particular embodiments may provide incremental upgrade packages that are shard across different groupings with varying scopes. For example, a computing system may build separate upgrade packages for chain-wide products, region-wide products, store-cluster products, and store-specific products. Chain-wide products include products that are common to all or most of the chain (e.g. ABC Supermarket chain). Region-wide products include products that are common to all or most of a chain's operating region (e.g., ABC Supermarket's branches located in California). Store-cluster products include products that are common to a collection of stores (but not common enough to be included in a region) (e.g., ABC Supermarket's branches located at the California-Nevada border or in a pocket of San Francisco). Store-specific products include products that are unique to a store or not common enough to be included in the other wider scopes. Building upgrade packages based on product commonalities improves metadata sharing (e.g., product name, description, photo, etc.) and reduces file size, and the manner in which upgrade packages are shard across different scopes provides flexibility to support integration with individual store catalogs as well as central chain-wide catalogs.

Product commonalities may be determined in a variety of ways. In particular embodiments, commonalities between products offered by different stores may be determined by product metadata (e.g., name, description, SKU, and/or photo) matching. Exactly matches may provide the highest confidence that two products are indeed the same, but it is also possible that two products that are in fact the same have slightly different product metadata (e.g., due to marketing efforts by the manufacturer or data-entry error, the name, description, or other product metadata of one product offered by one store might be slightly different from the same product offered by another store). Thus, in particular embodiments, commonalities may be determined based on a confidence range. For example, string-edit distance may be used to compare product names or descriptions. If the string-edit distance is within a predetermined threshold, the products may be deemed to be the same. As another example, a machine-learning model may be trained to determine whether two products are the same. The machine-learning model may learn to process one or more product metadata (e.g., product name, description, photo, price, etc.) of multiple products and determine whether the products are the same. The training data used for training the machine-learning model may include the product metadata of interest and known "ground truth" answers that indicate whether the products are the same or not. During training, the machine-learning model may process the input product metadata associated with a training sample and output a prediction (e.g., '0' indicating that the products are different, and '1' indicating that the products are the same). The prediction may be compared to the ground truth associated with that training sample using a loss function. The result of the comparison may then be used to update the machine-learning model so that it performs better in the next training iteration. Training may converge and terminate when the comparison loss is sufficiently small or after a sufficiently large number of training samples (e.g., hundreds or thousands of samples) have been used to train the model.

The package sharding process may further slice upgrade packages based on sales volume, promotional activity, data-modification velocity, and/or other factors relevant for prioritizing package downloads. In particular embodiments, the metadata and/or pricing data of each product may be annotated with additional data, such as those listed above, to enable the upgrade-package building system to make sharding decisions. Sales volume may indicate the historical volume of sales for a product. Promotional activity may indicate the existence of any ongoing promotional activity for a product. Data-modification velocity indicates the relative frequency or rate at which the data is modified. For example, the name or description of a product would usually remain static, but the photo of the product might change more frequently since the packaging of products changes often to attract attention. Similarly, the price of some products might change more frequently compared to others (e.g., the price of seafood might fluctuate more than toothpaste).

Figure 3:
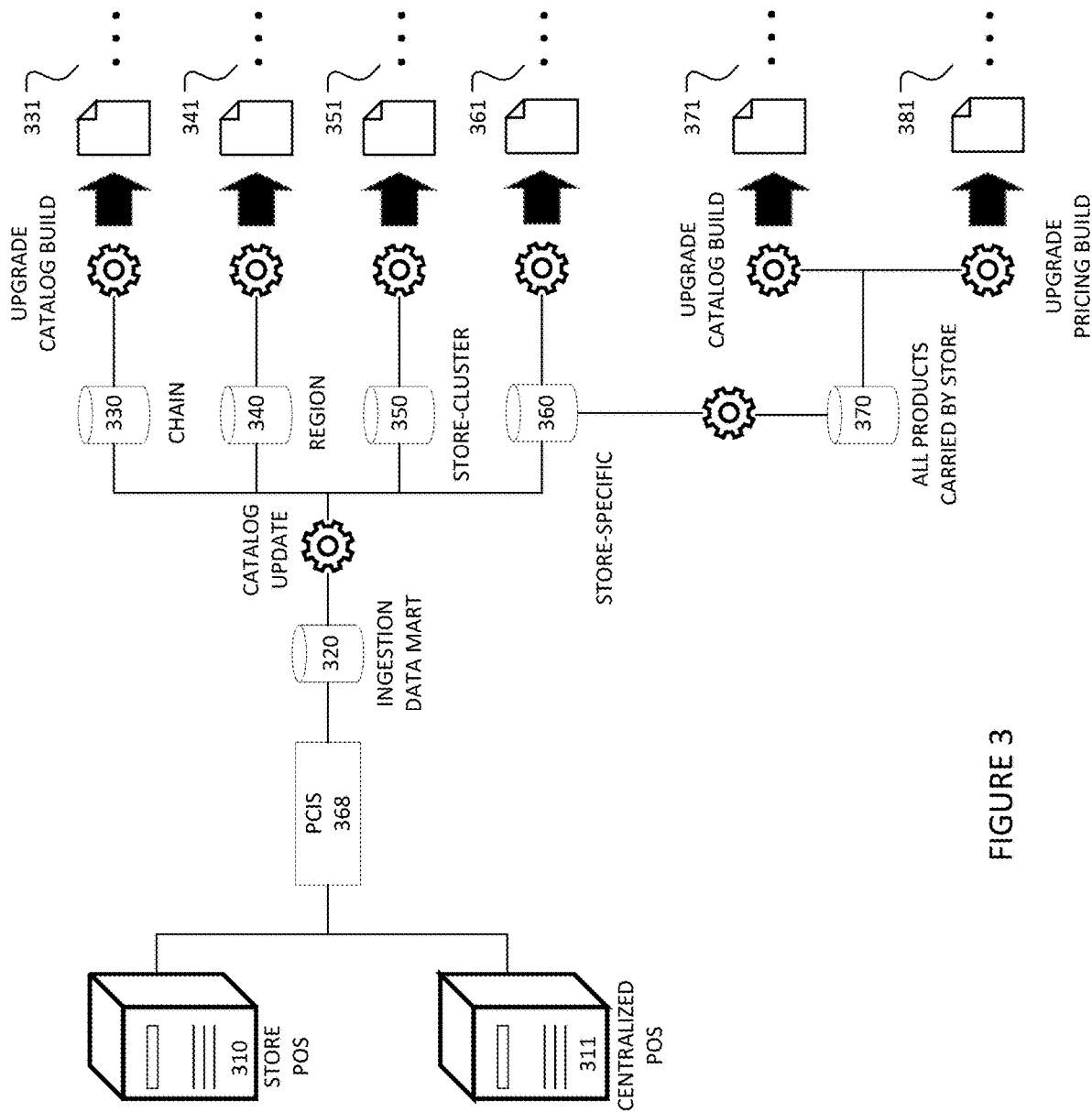
FIG. 3 illustrates an example of building upgrade packages.

FIG. 3 illustrates an example of building upgrade packages. In particular embodiments, a product catalog integration service 368 receives information from one or more point of sale (POS) systems of individual stores 310 and the centralized chain-wide system 311. The PCIS 368 integrates and stores the information in ingestion data mart 320. Information stored in the data mart 320 may include, but is not limited to, catalog data (e.g., product description, product image, and other non-price data related) and pricing data. Based on the information available for each product, the system identifies product commonalities that are chain-wide 330, region-wide 340, store-cluster specific 350, and/or unique to particular establishments 360 and use them to generate respective chain-wide upgrade files 331, region-wide upgrade files 340, store-cluster upgrade files 351, and/or store-specific upgrade files 361. In addition, the system may further identify all products that are carried by each store 370 and generate store-specific catalog upgrade files 371 and full pricing upgrade files 381.

In particular embodiments, chain-wide upgrade files 331, region-wide upgrade files 340, store-cluster upgrade files 351, and/or store-specific upgrade file 361 may each include a collection of versioned metadata catalogs, incremental update catalogs, and intra-version update catalogs. The computing system that builds the upgrade packages may build a collection of versioned metadata catalog on a regular interval (e.g., weekly, bi-weekly, monthly, etc.). Each of these may be referred to as a "base" catalog. Since the interval between builds may be relatively lengthy, the information included in the versioned metadata catalog may include fairly static information (e.g., product name, description, size, photos, etc.) and exclude information that is updated more frequently (e.g., pricing). The system may build versioned metadata catalogs for different scopes. For example, a series of versioned metadata catalogs may be built for chain-wide products, region-wide products, store-cluster products, and store-specific products. Each versioned metadata catalog may be a full version that includes all the product metadata belonging to a particular scope. For example, for the chain-wide products, the system may build the following weekly versioned metadata catalogs in the year 2020: v2020.01.01(full), v2020.02.01(full), v2020.51.01(full), and v2020.52.01(full). The system may similarly build versioned metadata catalogs for region-wide products, store-cluster products, and store-specific products. In particular embodiments, each versioned metadata catalog may be further sliced into sub-files based on one or more calculated priorities (e.g., sales volume, promotional activity, etc.).

In particular embodiments, the system may further build a collection of incremental update catalogs for the last several supported versions to the current version of the catalog. The incremental update catalogs may include the same type of information included in the versioned metadata catalogs (e.g., product name, description, size, and photos, excluding pricing). The system may build incremental update catalogs for different scopes (e.g., chain-wide, region-wide, store-cluster, and/or store-specific products). For example, for the chain-wide products, the system may build the following incremental update catalogs in the year 2020: v2020.01.01-2020.02.01, v2020.02.01-2020.03.01, . . . v2020.50.01-2020.51.01, and v2020.51.01-2020.52.01. The naming convention of an incremental update catalog indicates the starting and ending version numbers that the incremental update catalog is designed to upgrade. For example, v2020.50.01-2020.51.01 is for incrementally upgrading a v2020.50.01 catalog to the v2020.51.01 catalog. These incremental update catalogs provide more granular upgrade packages so that a client device with a particular outdated version installed may download one or more incremental update catalogs to upgrade to the latest available versioned metadata catalog. For example, if the client device currently has version v2020.41.01 and the latest available version is v2020.43.01, the device may download incremental update catalogs v2020.41.01-2020.42.01 and v.2020.42.01-2020.43.01. Otherwise, the client device would need to download the full version of v2020.43.01, which is much larger than the sum of the incremental update catalogs needed. The system may similarly build incremental update catalogs for region-wide products, store-cluster products, and store-specific products. In particular embodiments, each incremental update catalog may be further sliced into sub-files based on one or more calculated priorities (e.g., sales volume, promotional activity, etc.).

To account for fast-moving updates that occur between regular intervals (e.g., weekly intervals), particular embodiments may further build a collection of intra-version update catalogs on a shorter interval (e.g., every day, hour, or minute) which can be applied to the latest versioned metadata catalog (or base catalog). For example, after the generation of the latest versioned metadata catalog v2020.43.01 but before the generation of the next versioned metadata catalog v2020.44.01, there may be changes to the products carried by some of the stores. To account for those changes before the next versioned metadata catalog is generated, the system may build an intra-version update catalog v2020.43.01-now, which would update the current base version to the latest state of catalog information. Continuing with the example above where the client device currently has version v2020.41.01 installed and the latest available base version is v2020.43.01, the device may download incremental update catalogs v2020.41.01-2020.42.01 and v.2020.42.01-2020.43.01 to get to v2020.43.01, and then install the latest intra-version update catalog v2020.43.01-now to obtain the most up-to-date product information. The intra-version update catalog may include the same type of information included in the versioned metadata catalogs and incremental update catalogs (e.g., product name, description, size, and photos, excluding pricing). The system may build intra-version update catalogs for different scopes (e.g., chain-wide, region-wide, store-cluster, and/or store-specific products). In particular embodiments, each intra-version update catalog may be further sliced into sub-files based on one or more calculated priorities (e.g., sales volume, promotional activity, etc.).

The build process described above generates upgrade catalogs for different scopes. In particular embodiments, the build system may further generate a catalog for every product carried by each store. For example, the store-specific catalog upgrade file 371 may contain the metadata for all products carried by a particular store. This may be particularly useful when a client device is just starting to use the service and does not have any existing catalog data stored, or when the version installed on the client device is no longer supported. In either case, the client device may download the full metadata catalog for a particular store of interest.

In particular embodiments, pricing data may be treated separately from other product data since price is constantly in flux (i.e., higher modification velocity). By handling price updates separately, the system could avoid unnecessarily updating a product's other metadata just because its price changed. In particular embodiments, update files for pricing data may be generated for different scope (e.g., chain-wide, region-wide, store-cluster, and/or store-specific products), similar to the update files for other product metadata. However, since pricing information is fairly small (e.g., the price of each product can be representing using a single number), an update file for pricing data may be generated for all the products carried by each store. In particular embodiments, the update file may be sliced into sub-files based on a calculated priority (e.g., sales volume, promotional activity, etc.).

The computing system that builds the upgrade packages may build a collection of versioned pricing tables on a regular interval (e.g., weekly, bi-weekly, monthly, etc.). Each of these may be referred to as a "base" pricing table. For example, the system may build the following weekly versioned pricing table in the year 2020: v2020.01.01(full), v2020.02.01(full), v2020.51.01(full), and v2020.52.01(full). In particular embodiments, the system may further build a collection of incremental update pricing tables for the last several supported versions to the current version of the pricing table. For example, the system may build the following incremental update pricing tables in the year 2020: v2020.01.01-2020.02.01, v2020.02.01-2020.03.01, . . . v2020.50.01-2020.51.01, and v2020.51.01-2020.52.01. The naming convention of an incremental update pricing table indicates the starting and ending version numbers that the incremental update is designed to upgrade. For example, v2020.50.01-2020.51.01 is for incrementally upgrading v2020.50.01 pricing tables to the v2020.51.01 pricing tables. To account for fast-moving updates that occur between regular intervals (e.g., weekly intervals), particular embodiments may further build a collection of intra-version update pricing tables on a shorter interval (e.g., every day, hour, or minute) which can be applied to the latest versioned pricing table (or base pricing table). For example, after the generation of the latest versioned pricing table v2020.43.01 but before the generation of the next versioned pricing table v2020.44.01, there may be changes to the store's product pricing. To account for those changes before the next versioned pricing table is generated, the system may build an intra-version update pricing table v2020.43.01-now, which would update the current base version to the latest state of the pricing information. In an example where the client device currently has version v2020.41.01 installed and the latest available base version is v2020.43.01, the device may download incremental update pricing table v2020.41.01-2020.42.01 and v.2020.42.01-2020.43.01 to get to v2020.43.01, and then install the latest intra-version update pricing table v2020.43.01-now to obtain the most up-to-date pricing information.

Since pricing data could change rapidly, the system may additionally or alternatively generate versioned intra-version pricing tables that each has the then-current full pricing table (instead of just the updated prices). For example, during week 43, the system may generate v2020.43.1.1, v2020.43.1.2, v2020.43.1.3, . . . , and v2020.43.1.15, each of which contains the full pricing table of the products carried by a particular store. The system may further generate intra-version incremental update pricing tables that update the last several supported intra-version pricing tables to the latest intra-version pricing tables. For example, if v2020.43.1.15 is the latest intra-version pricing table available, the system may generate v2020.43.1.1-2020.43.1.15, v2020.43.1.2-2020.43.1.15, . . . , v2020.43.1.14-2020.43.1.15.

In particular embodiments, the build system may generate a collection of manifest files to help a client device determine the appropriate upgrade package to download and where it may be downloaded (e.g., the location may be specified using a URI). Manifest files may be scope specific (e.g., chain-wide, region-wide, store-cluster, and/or store-specific). Each manifest file may provide upgrade instructions associated with different supported catalog versions. The instructions within the manifest file would specify the upgrade packages (e.g., one or more incremental update catalogs or pricing tables, one or more intra-version update catalogs or pricing tables, etc.) that need to be downloaded in order to upgrade a particular catalog version to the latest version. The manifest file may also indicate the order in which the update files should be applied. For example, if the client device currently has version v2020.41.01 installed and the latest available base version is v2020.43.01, the manifest file may specify that v2020.41.01-2020.42.01 should be applied first, followed by v.2020.42.01-2020.43.01 and any intra-version updates. The manifest file may separately specify the upgrade order for product catalog metadata (e.g., product name, description, photo, etc.) and pricing table. If the client device currently has an unsupported version installed, the manifest file may specify which full version of the catalog metadata and/or pricing table to download. In particular embodiments, client devices may access a manifest file using a URI with a well-known schema so that the client device only needs to know the store the user is located or intends to visit in order to obtain the manifest file. For example, the schema may be: www.ABC-Grocery.com/manifest/id-<storeID>.man. Thus, if a user is at or intends to visit a store with ID 123, the URI for the manifest file may be www.ABC-Grocery.com/manifest/id-123.man. Once the client obtains the manifest file, it could determine which upgrade package to obtain.

In particular embodiments, the catalog files, pricing table files, and manifest files may be provided to users through an internet storage system that supports common edge caching. The manner in which the files are shard and named allows the files to leverage industry-standard edge-caching solutions that offer significant performance and cost savings compared to alternatives for generating offline database updates.

In particular embodiments, the client-side application may store product metadata and pricing data in separate data repositories with varying scopes that match the scopes used by the enterprise system to shard update data. For example, if update data are shard in a chain-wide and store-specific manner, the client-side application may also store data in the same manner (e.g., having one repository for metadata related to chain-wide products and another repository for metadata related to store-specific products). Doing so allows the client-side application to rapidly ingest data.

Figure 4A:
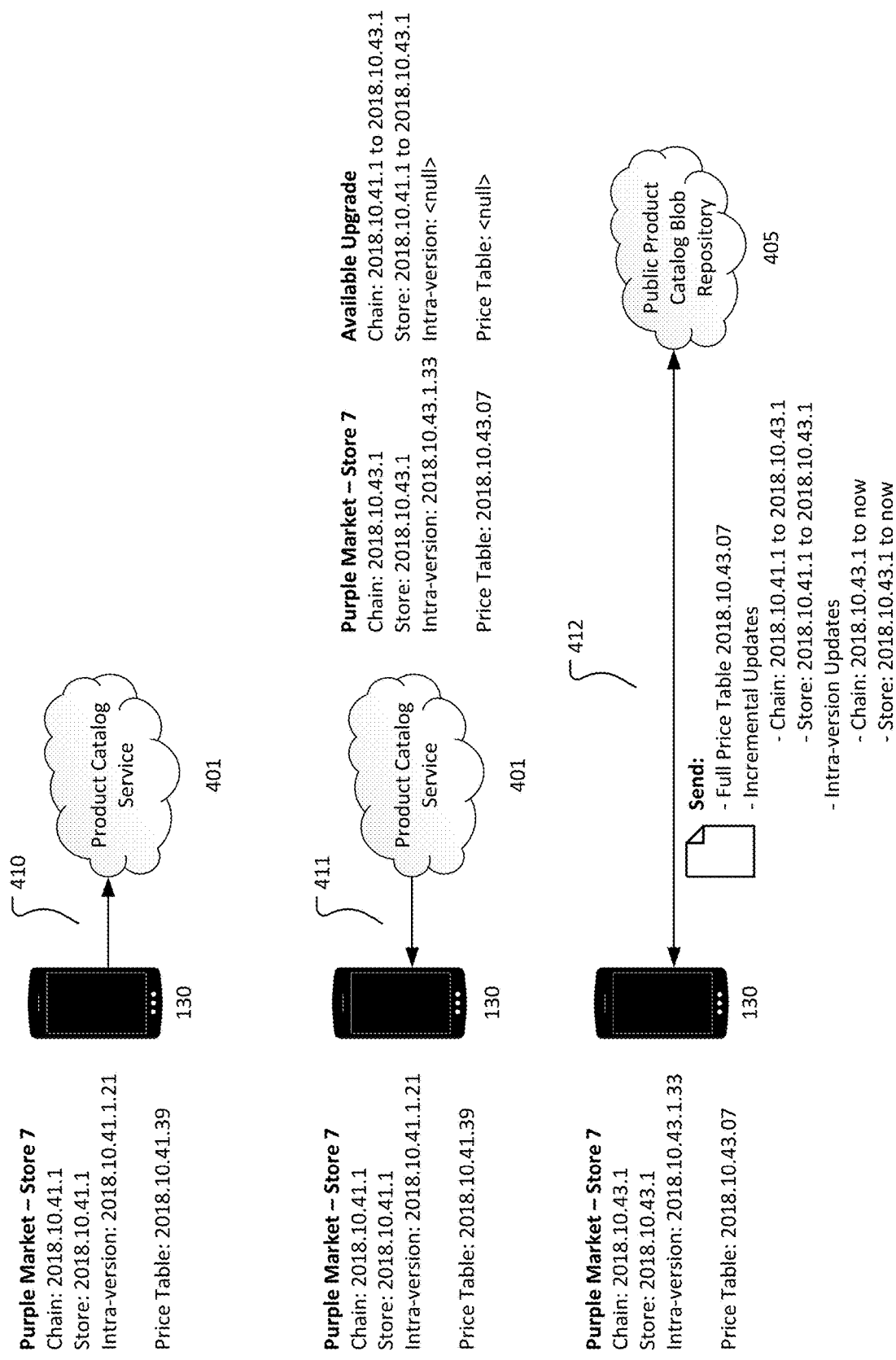

FIG. 4A illustrates an example catalog upgrade scenario where the user revisits a store after two weeks. When the client device 130 visited a particular store (i.e., store 7) of the Purple Market chain two weeks ago, it obtained catalog metadata version v2018.10.41.1 for chain-wide and store-specific products, as well as intra-version v2018.10.41.1.21. Additionally, it downloaded pricing table v2018.10.41.39. When the client device 130 visits store 7 again, it first sends a request 410 to product catalog service 401 for the manifest file for store 7. In response to the request 410, the product catalog service 401 sends back 411 the manifest file for store 7. At the time of the request 410, store 7's latest data are: chain-wide metadata version v2018.10.43.1, store-specific metadata version v2018.10.43.1, intra-version v2018.10.43.1.33, and pricing table v2018.10.43.07. The manifest file indicates that upgrade packages exist for upgrading the chain-wide and store-specific metadata from v2018.10.41.1 to v2018.10.43.1. There is no suitable intra-version upgrade since the client device 130's v2018.10.41.1.21 copy is too old (it is from week 41 and therefore no longer an intra-version upgrade for the current week 43). Further, there is no pricing table upgrade, since it would be more efficient for client device 130 to download the full up-to-date version. After determining which upgrade packages to download using the manifest file, the client device 130 communicates 412 with a repository 405 (e.g., hosted by a content delivery network). From the repository 405, the client 130 obtains the full pricing table v2018.10.43.07, incremental updates for updating the chain-wide and store-specific metadata from v2018.10.41.1 to 2018.10.43.1, and intra-version updates for updating the chain-wide and store-specific metadata from v2018.10.43.1 to the latest. After the upgrade, the client device 130 has the same data as store 7.

Figure 4B:
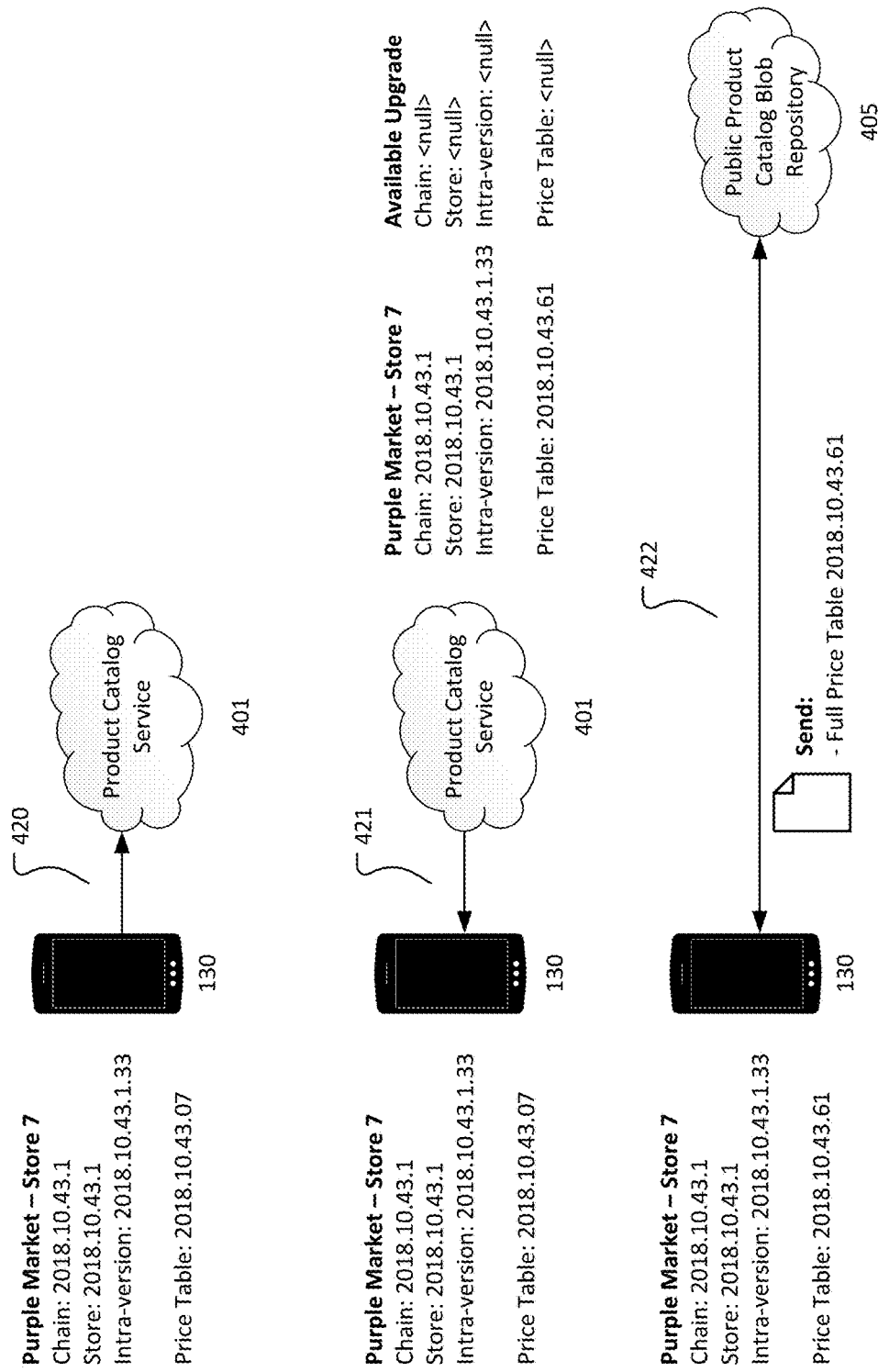

FIG. 4B illustrates an example catalog upgrade scenario where the user revisits a store within the same week. Continuing with the example described above, the client device has metadata version v2018.10.43.1 for chain-wide and store-specific products, intra-version v2018.10.41.1.33, and pricing table v2018.10.43.07. When the client device 130 revisits store 7 in the same week (i.e., week 43 in the example shown), it first sends a request 420 to product catalog service 401 for the manifest file for store 7. In response to the request 420, the product catalog service 401 sends back 421 the manifest file for store 7. At the time of the request 420, store 7's latest data are chain-wide metadata version v2018.10.43.1, store-specific metadata version v2018.10.43.1, intra-version v2018.10.43.1.33, and pricing table v2018.10.43.61. The manifest file indicates that the client device 130's data is up-to-date except for its pricing table. Thus, in this case, there is no need to download catalog upgrades. The client device 130 communicates 422 with repository 405 to obtain only the full pricing table v2018.10.43.61. After the upgrade, the client device 130 has the same data as store 7.

FIG. 4C illustrates an example catalog upgrade scenario where the user revisits a store after six weeks (week 37 to week 43). When the client device 130 visited a particular store (i.e., store 7) of the Purple Market chain six weeks ago, it obtained catalog metadata version v2018.10.37.1 for chain-wide and store-specific products, as well as intra-version v2018.10.37.1.21. Additionally, it downloaded pricing table v2018.10.37.07. When the client device 130 visits store 7 again, it first sends a request 430 to product catalog service 401 for the manifest file for store 7. In response to the request 430, the product catalog service 401 sends back 431 the manifest file for store 7. At the time of the request 430, store 7's latest data are: chain-wide metadata version v2018.10.43.1, store-specific metadata version v2018.10.43.1, intra-version v2018.10.43.1.33, and pricing table v2018.10.43.07. The manifest file indicates that upgrade packages exist for upgrading the chain-wide metadata from v2018.10.37.1 to v2018.10.43.1. However, for the store-specific metadata, the full version is smaller than the incremental updates made from v2018.10.37.1 to v2018.10.43.1, so no incremental upgrade is deemed available. There is no suitable intra-version upgrade since the client device 130's v2018.10.37.1.21 copy is too old (it is from week 37 and therefore no longer an intra-version upgrade for the current week 43). Further, there is no pricing table upgrade, since it would be more efficient for client device 130 to download the full up-to-date version. After determining which upgrade packages to download using the manifest file, the client device 130 communicates 432 with a repository 405 (e.g., hosted by a content delivery network). From the repository 405, the client 130 obtains the full pricing table v2018.10.43.07, incremental updates for updating the chain-wide metadata from v2018.10.37.1 to 2018.10.43.1, the full store-specific metadata v.2018.10.43.1, and intra-version updates for updating the chain-wide and store-specific metadata from v2018.10.43.1 to the latest. After the upgrade, the client device 130 has the same data as store 7. As illustrated by this example, by sharding data into different scope levels (e.g., chain-wide and store-specific), a more efficient upgrade can be realized.

Figure 5:
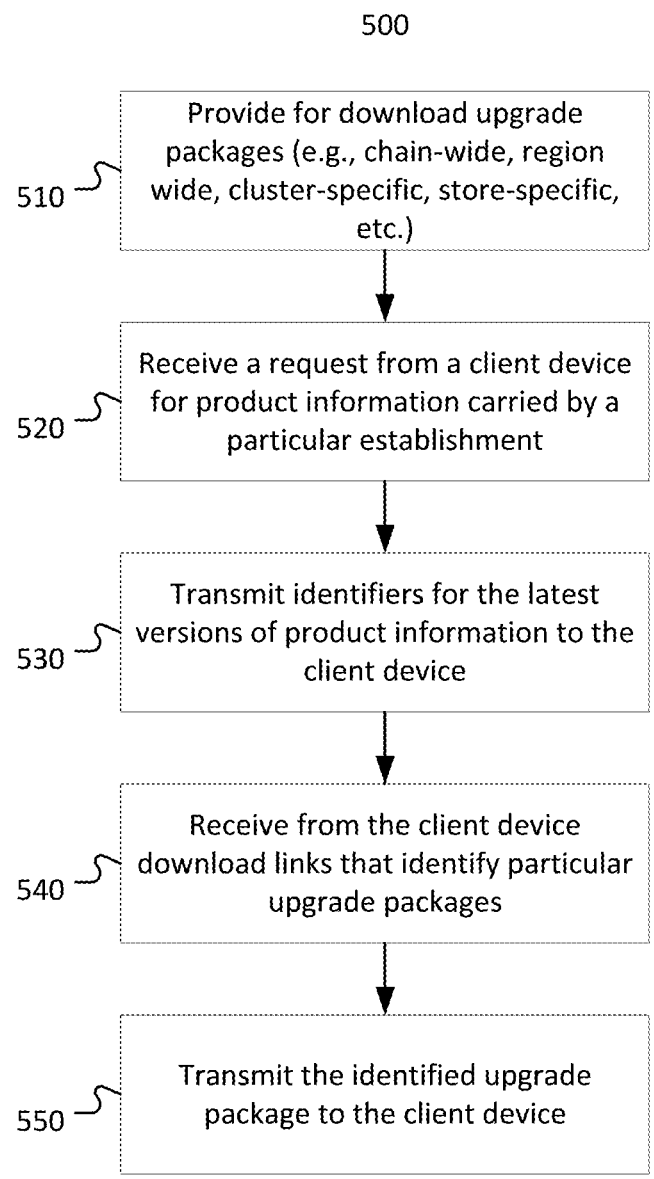
FIG. 5 illustrates an example method for providing upgrade packages for product information to a client device

FIG. 5 illustrates an example method 500 for providing upgrade packages for product information to a client device. The method may begin at step 510, where a computing system associated with a plurality of establishments (e.g., related brick-and-mortar stores, such as a grocery chain) provides for download a plurality of upgrade packages for upgrading product information (e.g., pricing table and catalog metadata such as product name description, and photo). The computing system may include any number of individual computers that collectively provide the upgrade service. For example, the computing system may include computers configured to build the upgrade packages, computers configured to respond to requests from client devices and send instructions (e.g., manifest files) on where to download the upgrade packages, and computers configured to deliver the upgrade packages (e.g., CDN). In particular embodiments.

The upgrade packages can vary in size based on the set of products common to each predefined establishment scope (e.g., chain-wide, region-wide, cluster-specific, store-specific, etc.). Each predefined establishment scope may correspond to a subset of the plurality of establishments. For example, a subset of the plurality of establishments may correspond to the establishments in a chain, the establishments in a region, the establishments in a cluster, an individual establishment, or any other suitable predefined grouping of establishments. Thus, for example, the computing system may provide for download a plurality of first upgrade packages (e.g., full packages, incremental update packages, intra-version update packages, etc.) for upgrading product information associated with a first set of products that are available at a first subset of the plurality of establishments, a plurality of second upgrade packages for upgrading product information associated with a second set of products that are available at a second subset of the plurality of establishments, and so on. The second subset of establishments may be a subset of the first subset of establishments (e.g., an individual establishment is a subset of the establishments in the region where the individual establishment is located; the establishments in the region form a subset of the establishments in the entire chain). The second set of products and the first set of products may include different products (e.g., the products common to chain-wide stores may be different from products common to region-wide stores).

In some embodiments, the number of establishments in the plurality of establishments and associated subsets of the plurality of establishments can vary based on any suitable grouping. In some embodiments, the subsets are defined based on a geographic scope (e.g., chain-wide, region-wide, cluster-specific, store-specific, etc.). Thus, in the example described above, the first subset of the plurality of establishments may be located within a first geographic scope and the second subset of the plurality of establishments may be located within a second geographic scope, with the second geographic scope being smaller than the first geographic scope. In one example, the first subset of the plurality of establishments may include all establishments of a certain chain in a certain region, such as all the ABC Markets, while a second and subsequent subset may include all ABC Markets in the state of California, all ABC Markets in the City of San Francisco, all ABC Markets on Main Street, etc., all the way down to a subset consisting of a single ABC Market establishment. Other commonalities for determining subsets of the plurality of establishments may include but are not limited to, establishments on various delivery routes, total revenue, total sales, establishment size, total number of consumers per week, etc.

At step 520, the computing system may receive, from a client device, a request identifying a first establishment of interest among the plurality of establishments. For example, as described elsewhere herein, the client device may use its GPS location to determine that it is within a threshold proximity to a particular establishment. In some embodiments, the identification of a first establishment among the plurality of establishments may be based on the relative location of the client device to the establishment. However, this disclosure permits any suitable means for making this identification. For example and not by way of limitation, this may include the computing system identifying the establishment based on: a location of the client device relative to the establishment; a wifi connection between the client device and a network associated with the establishment; a BLUETOOTH connection between the client device and a network associated with the establishment; a request initiated by a user within a mobile application on the client device, specifying a particular establishment; the location history of the client device; the direction and speed in which the client device 130 is traveling, etc. The identified establishment of interest is part of larger subsets of establishments (e.g., establishments in the region and/or chain), such as the aforementioned first subset of establishments and the second subset of establishments. After determining the establishment of interest, the client device may query the computing system to inquire about what upgrade packages are available for that establishment. For example, the client device may send a request to a known service address (e.g., URL) hosted by the computing system and specify an establishment ID that uniquely identifies the particular establishment of interest.

At step 530, the computing system may transmit to the client device identifiers that identify the latest versions of product information available for the establishment of interest. For example, the identifiers (e.g., v2020.10.43.01) may be associated with the latest versions of product information available for products common to the chain of establishments in which the establishment of interest belongs, additional products common to the region of establishments in which the establishment of interest belongs, additional products common to the cluster of establishments in which the establishment of interest belongs, and additional products carried by the establishment of interest. Continuing with the example provided above, the computing system may transmit, to the client device, a first identifier identifying a first latest version of product information associated with the first set of products and a second identifier identifying a second latest version of product information associated with the second set of products. In particular embodiments, the identifiers may be provided within a manifest file. In some embodiments, the identifier that identifies the latest version of a set of products may be in a numbering format derived from the version number. However, any suitable convention that makes a distinction between different iterations of product information for a set of products is appropriate.

At step 540, the computing system may receive from the client device download links that identify particular upgrade packages for upgrading the versions of product information located on the client device to the latest versions. For example, continuing with the example provided above, the computing system may receive one or more first download links that identify one or more of the plurality of first upgrade package and one or more second download links that identify one or more of the plurality of second upgrade packages. The upgrade packages identified by the first download links may be used to upgrade, e.g., chain-wide product information, and the upgrade packages identified by the second download links may be used to upgrade, e.g., store-specific product information. In some embodiments, the one or more first download links may be generated based on the first identifier, and the one or more second download links may be generated based on the second identifier. For example, the computing system may generate the links, which may contain identifiers that correspond to the latest versions of product information, and provide the links in the manifest file. Using the manifest file, the client device may select the most appropriate upgrade packages to download based on the existing version stored on the client device. The client device may then use the links associated with those upgrade packages to obtain the files. In another embodiment, the client device may use a pre-defined schema to generate the link. For example, based on an identifier identifying the existing version installed on the client device and the identifier identifying the latest version available, the client device may use the predefined schema to generate the link for the appropriate upgrade packages.

In some embodiments, each of the plurality of upgrade packages associated with a set of products and corresponding download links may be configured to upgrade a previous version of product information associated with the set of products to the latest version. Thus, multiple upgrade packages may exist for a specific set of products to enable multiple client devices, each containing different non-latest versions of upgrade packages associated with a set of products, to upgrade to the latest version via a single upgrade package. For example and not by way of limitation, a first client device may visit an establishment frequently, resulting in the first client device having version 9.3 of a product set installed at the time the computing system receives the request from the first client device. A second client device that visits the establishment frequently may only have version 5.1 of the same product set installed at the time the computing system receives the request from the second client device. In this scenario, the computing system would transmit a first download link to the first client device, which can be used to download the upgrade package from version 9.3 to version 10.2, while the computing system would transmit a second download link to the second client device, which can be used to download the upgrade package from version 5.1 to version 10.2. In particular embodiments, the computing system may dynamically generate a download link for each requesting device (e.g., the request from the client device may specify the local version on the device and the establishment of interest, and the computing system could use that information to generate a download link). In other embodiments, the manifest file sent to the client device may include pre-generated links for all supported versions, and the client would simply need to select which link to use.

In some embodiments, the download link is generated by the client device. For example and not by way of limitation, computing system transmits the latest version identifier to the client device, for example, version 10.2, without knowing which version is currently installed on the client device (e.g., the information could be part of a manifest file for the establishment of interest). In this embodiment, the client device would generate the download link to upgrade to the latest version. Hence, if client device received a version identifier corresponding to version 10.2 of product information associated with a set of products from computing system as the latest version, and the client device currently has version 8.6 of product information associated with the set of products stored, client device would generate a download link based on this identifier to download an upgrade package to upgrade from version 8.6 to version 10.2.

In some embodiments, multiple download packages may be transmitted through multiple download links to a single client device for a single establishment and a single request from a client device. For example and not by way of limitation, in one embodiment the computing system may transmit to the client device a first upgrade package containing upgraded product information associated with a set of products available at every establishment (chain), while also transmitting to the client device a second upgrade package containing upgraded product information associated with a set of products available only at the specific establishment that has been identified (e.g., a particular store).

At step 550, the computing system may transmit to the client device the upgrade packages identified by the received links. Continuing with the example above, the computing system may transmit, to the client device, the identified one or more first upgrade packages and the one or more second upgrade packages. The one or more first upgrade packages are configured to upgrade a first existing version of product information associated with the first set of products and a second existing version of product information associated with the second set of products stored on the client device to the first latest version of product information and the second latest version of product information. The upgrade packages may be transmitted through any suitable means. In one embodiment, the update packages will remain static and made available through CDNs. In particular embodiments, upgrade packages are versioned using standard software versioning semantics (e.g. major, minor, build number). When the computing system receives a request, it would receive a download link from the client device and determine which update package to transmit. If someone else had requested the same package before, the CDN would have it locally cached. As such, the user would be downloading a cached version of the package. Compared to downloading a dynamically generated package, downloading a locally cached version would be much faster.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for updating and delivering content to a client device including the particular steps of the method of FIG. 5, this disclosure contemplates any suitable method for updating and delivering content to a client device including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

The present invention solves many of the prior problems encountered by establishments using similar mobile applications. For example, through the use of multiple upgrade packages, which vary based on different subsets of products and establishments, client devices can directly upgrade from their version to the latest version of the product set. This discrete set of upgrade packages specific to a particular establishment and particular client device results in small package sizes that permit quick upgrading across a variety of environments. Further, certain upgrade packages may require updating less frequently than other upgrade packages, further reducing the bandwidth required to update a client device. For example, an upgrade package pertaining to the entire chain of establishments will likely update to a new latest version less frequently than an upgrade package pertaining to a specific subset of establishments. The use of a CDN or other similar means to transmit the upgrade packages furthers this goal, as the use of caching and minimization of physical distance reduces the latency when providing the download to the client device. The end result of the present invention is a computationally efficient solution with minimal scalability limitations across wide networks of establishments and geographic locations.

Figure 6A:
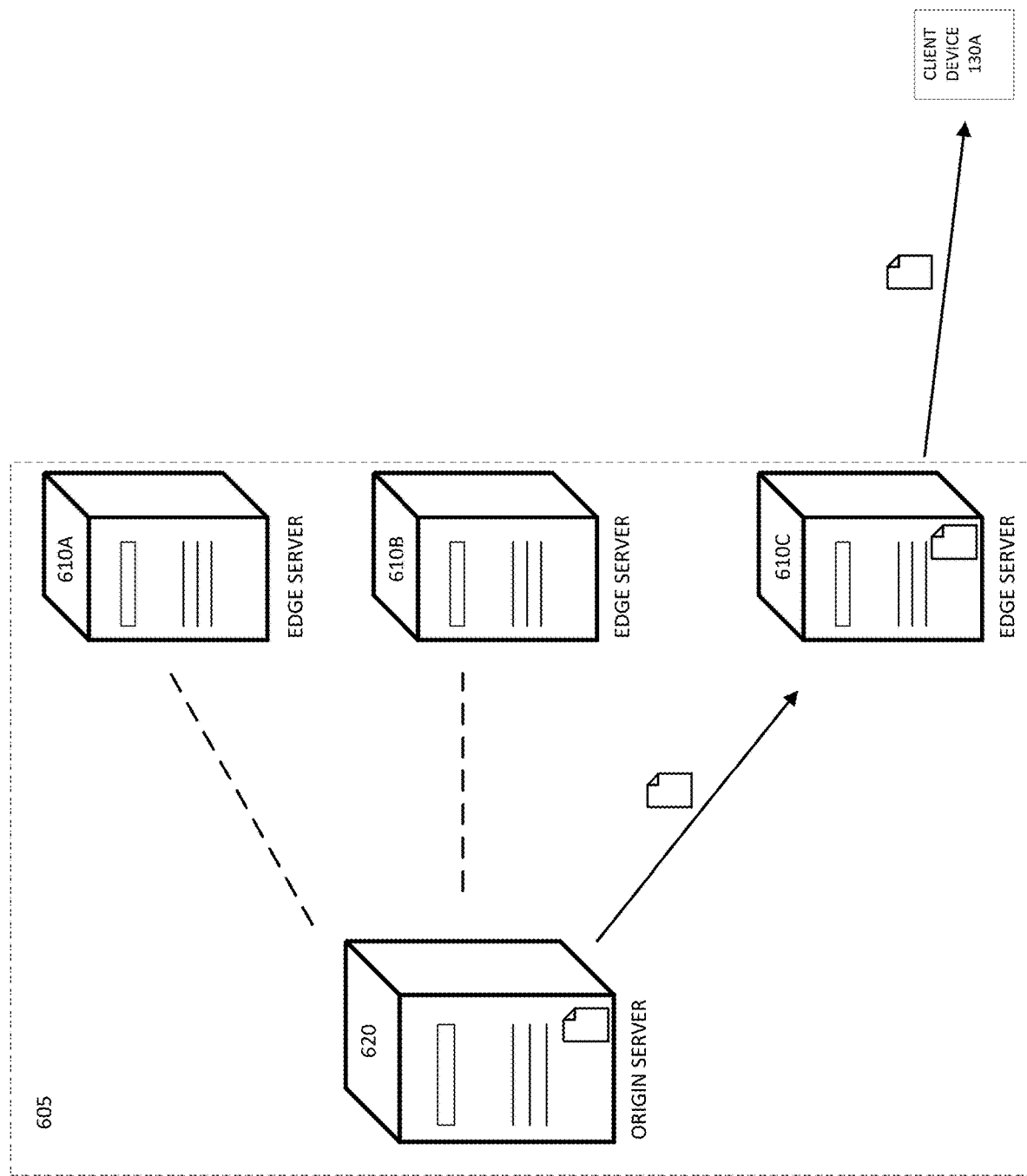
FIGS. 6A and 6B illustrate the benefit of leveraging edge-caching capabilities of content delivery networks (CDN).
Figure 6B:
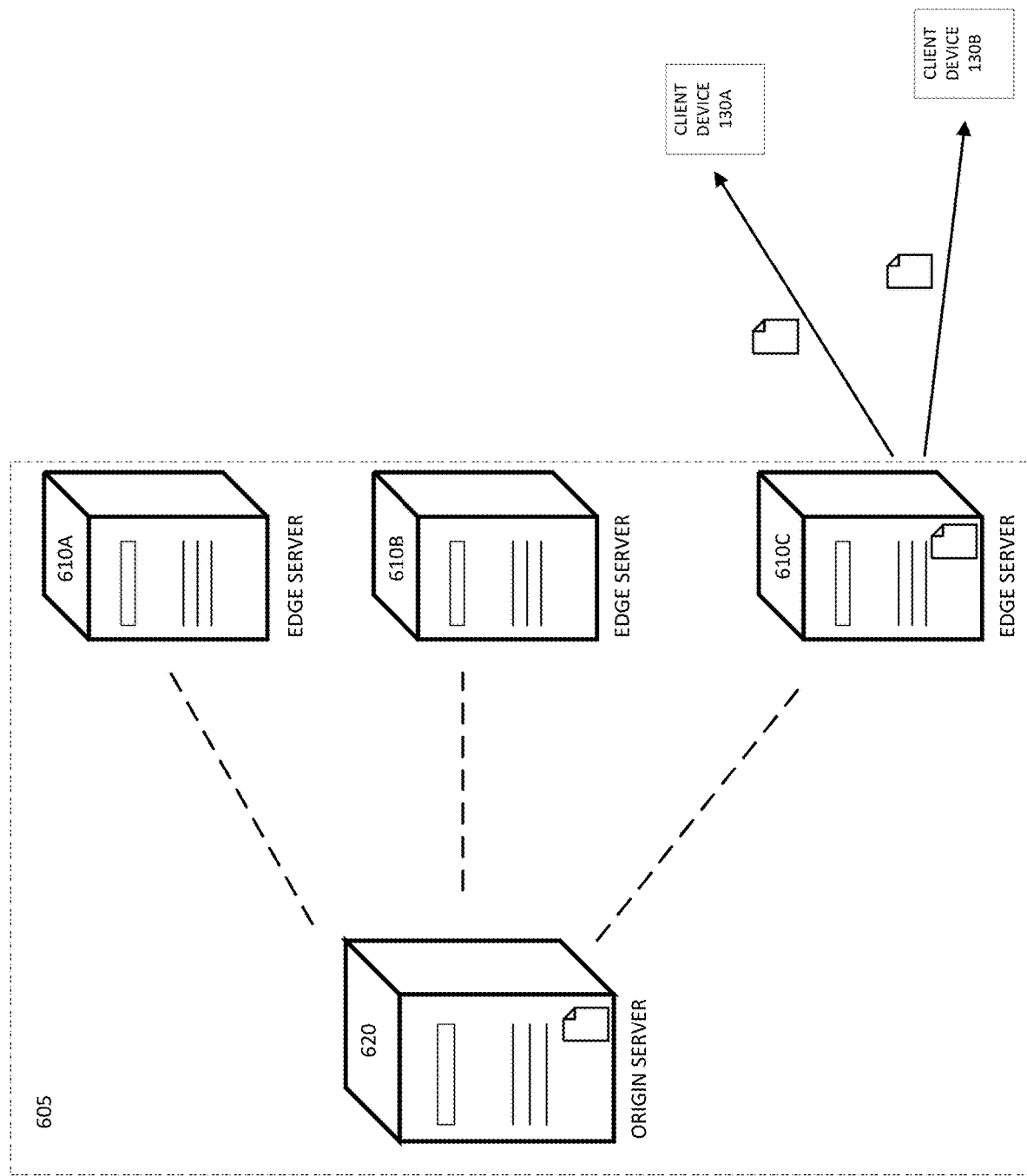

FIGS. 6A and 6B illustrates the benefit of leveraging edge-caching capabilities of content delivery networks (CDN). FIG. 6A shows a CDN 605 with an origin server 620 and three edge servers 610A, 620B, and 630C. The edge servers may be distributed across different geographic locations. Depending on the location of a client computing device 130A, the CDN 605 could assign the closest edge server to deliver the requested content (selection of the edge server may be based on other considerations as well, such as server availability and workload). In the example shown, computing device 130A is requesting an upgrade package from the CDN 605, and edge server 610C is selected to deliver the package. The edge server 610C determines that it does not have a local copy of the requested upgrade package to transmit to client device 130A. In response, edge server 610C requests the upgrade package file from origin server 620 within CDN 605. Origin server 620 transmits the appropriate upgrade package to edge server 610C, which then transmits the upgrade package to client device 130A. Edge server 610C then caches the upgrade package for future use. Subsequently, in FIG. 6B, edge server 610C receives additional requests for the same upgrade package from client devices 130A and 130B. Edge server 610C determines that, due to the previous download and subsequent cache, it has a local copy of the requested upgrade package to transmit to client devices 130A-B. As such, there is no need for edge server 610C to obtain the upgrade package from origin server 620, since edge server 610C can directly send its local copy of the upgrade package to client devices 130A-B. This creates a faster download and improved user experience.

Figure 7:
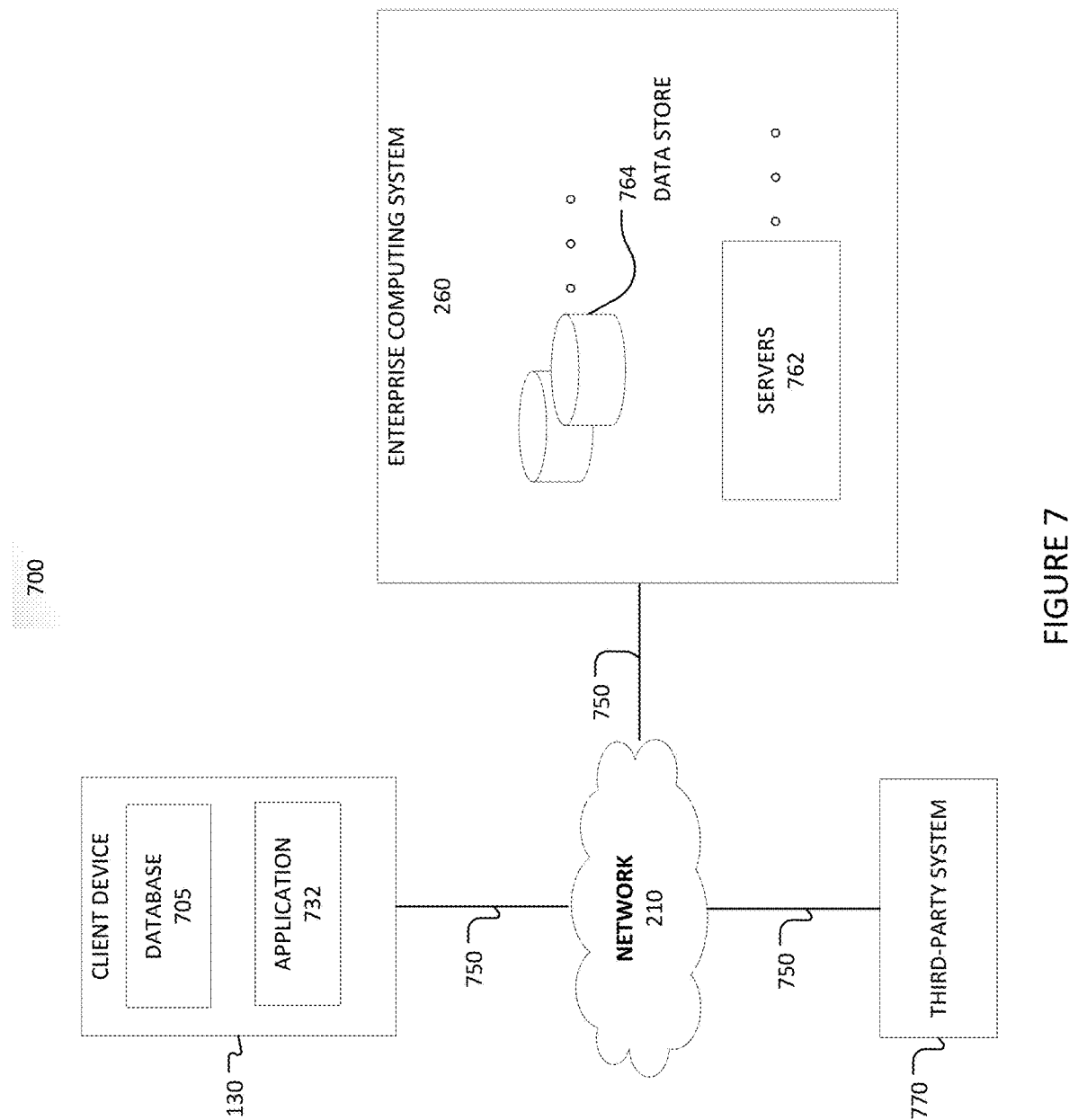
FIG. 7 illustrates an example network environment associated with an enterprise computing system.

FIG. 7 illustrates an example network environment associated with an enterprise computing system. Network environment 700 includes a client device 130, an enterprise computing system 260, and a third-party system 770 connected to each other by a network 210. Although FIG. 7 illustrates a particular arrangement of client device 730, enterprise computing system 260, third-party system 770, and network 210, this disclosure contemplates any suitable arrangement of the client device 130, enterprise computing system 260, third-party system 770, and network 210. This disclosure contemplates any suitable network 210. As an example and not by way of limitation, one or more portions of network 210 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular data network, or a combination of two or more of these. Network 210 may include one or more networks 210.

Links 750 may connect client device 130, enterprise computing system 260, and third-party system 770 to network 210 or to each other. This disclosure contemplates any suitable links 750. In particular embodiments, one or more links 750 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), cellular (such as Global System for Mobile communications (GSM) or Code-division multiple access (CDMA)), or optical (such as for example Synchronous Optical Network (SONET) or Synchronous Digital Hierarchy (SDH)) links. In particular embodiments, one or more links 750 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 750, or a combination of two or more such links 750. Links 750 need not necessarily be the same throughout network environment 700. One or more first links 750 may differ in one or more respects from one or more second links 750. For example, client device 130 may be connected to the enterprise computing system 260 and/or the third-party system 770 through a cellular data link, whereas enterprise computing system 260 and third-party system 770 may be connected through a fiber optic data link.

In particular embodiments, client device 130 may be an electronic device including hardware, software, or embedded logic components or a combination of two or more such components and capable of carrying out the appropriate functionalities implemented or supported by client device 130. As an example and not by way of limitation, a client device 130 may include a computer system such as a notebook or laptop computer, netbook, a tablet computer, e-book reader, personal digital assistant (PDA), handheld electronic device, cellular telephone, smartphone, augmented/virtual reality device, any other suitable electronic device, or any suitable combination thereof. This disclosure contemplates any suitable client systems 130. In particular embodiments, client device 130 may access network 210 and include one or more applications 732 and mobile database 705 executed locally on the client device 130. A client device 130 may enable its user to communicate with other users at other client systems 130. In particular embodiments, in the case when link 750 corresponds to a cellular data network (e.g., 5G or long-term evolution (LTE)), some structures (e.g., a concrete building) may act to inhibit access of client device 130 to network 210. As an example and not by way of limitation, a store that is made of concrete and containing a number of large metal objects (e.g., freezers, refrigerators, or shelves) may disrupt the connectivity of client systems 130 to network 210 while client systems are within the confines of the physical location.

In particular embodiments, enterprise computing system 260 may be a network-addressable computing system. The computing system 260 may be associated with one or more establishments (e.g., the computing system 260 may service a grocery chain with several physical locations). Enterprise computing system 260 may be accessed by the other components of network environment 700 either directly or via network 210. As an example and not by way of limitation, client device 130 may access enterprise computing system 260 using native application 732 associated with the enterprise computing system 260 (e.g., a mobile computing application, a messaging application, another suitable application, or any combination thereof) via network 210. In particular embodiments, enterprise computing system 260 may include one or more servers 762. Each server 762 may be a unitary server or a distributed server spanning multiple computers or multiple datacenters. Servers 762 may be of various types, such as, for example and without limitation, content delivery network, news server, mail server, message server, advertising server, file server, application server, exchange server, database server, proxy server, another server suitable for performing functions or processes described herein, or any combination thereof. In particular embodiments, each server 762 may include hardware, software, or embedded logic components or a combination of two or more such components for carrying out the appropriate functionalities implemented or supported by server 762. In particular embodiments, enterprise computing system 260 may include one or more data stores 764. Data stores 764 may be used to store various types of information. In particular embodiments, the information stored in data stores 764 may be organized according to specific data structures. In particular embodiments, each data store 764 may be a relational, columnar, correlation, or any other suitable database. Although this disclosure describes or illustrates particular types of databases, this disclosure contemplates any suitable types of databases. Particular embodiments may provide interfaces that enable a client device 130, an enterprise computing system 260, or a third-party system 770 to manage, retrieve, modify, add, or delete, the information stored in data store 764.

In particular embodiments, a third-party system 770 may include one or more types of servers, one or more data stores, one or more interfaces, including but not limited to APIs, one or more web services, one or more content sources, one or more networks, or any other suitable components, e.g., that servers may communicate with. A third-party system 770 may be operated by a different entity from an entity operating enterprise computing system 260. In particular embodiments, however, enterprise computing system 260 and third-party systems 770 may operate in conjunction with each other to provide enterprise computing services to users of enterprise computing system 260 or third-party systems 770. In this sense, enterprise computing system 260 may provide a platform, or backbone, which other systems, such as third-party systems 770, may use to provide enterprise computing services and functionality to users across the Internet.

In particular embodiments, enterprise computing system 260 may include a variety of servers, sub-systems, programs, modules, logs, and data stores. In particular embodiments, enterprise computing system 260 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Enterprise computing system 260 may also include suitable components such as network interfaces, security mechanisms, load balancers, failover servers, management-and-network-operations consoles, other suitable components, or any suitable combination thereof. In particular embodiments, enterprise computing system 260 may include a product catalog integration service (PCIS).

In particular embodiments, a method is provided for transmitting an upgrade package to a client device. Client device 130 may send a request to the computing system 260. In response to this request, computing system 260 may provide (e.g., via a CDN) for update a plurality of upgrade packages associated with one or more establishments, and upon receiving a request from a client device, identify and transmit identifiers to a client device that is associated with one or more set of products. In response, computing system 260 may then receive download links from the client device that are generated based on the identifiers and, in response, transmit upgrade packages to the client device 130.

Figure 8:
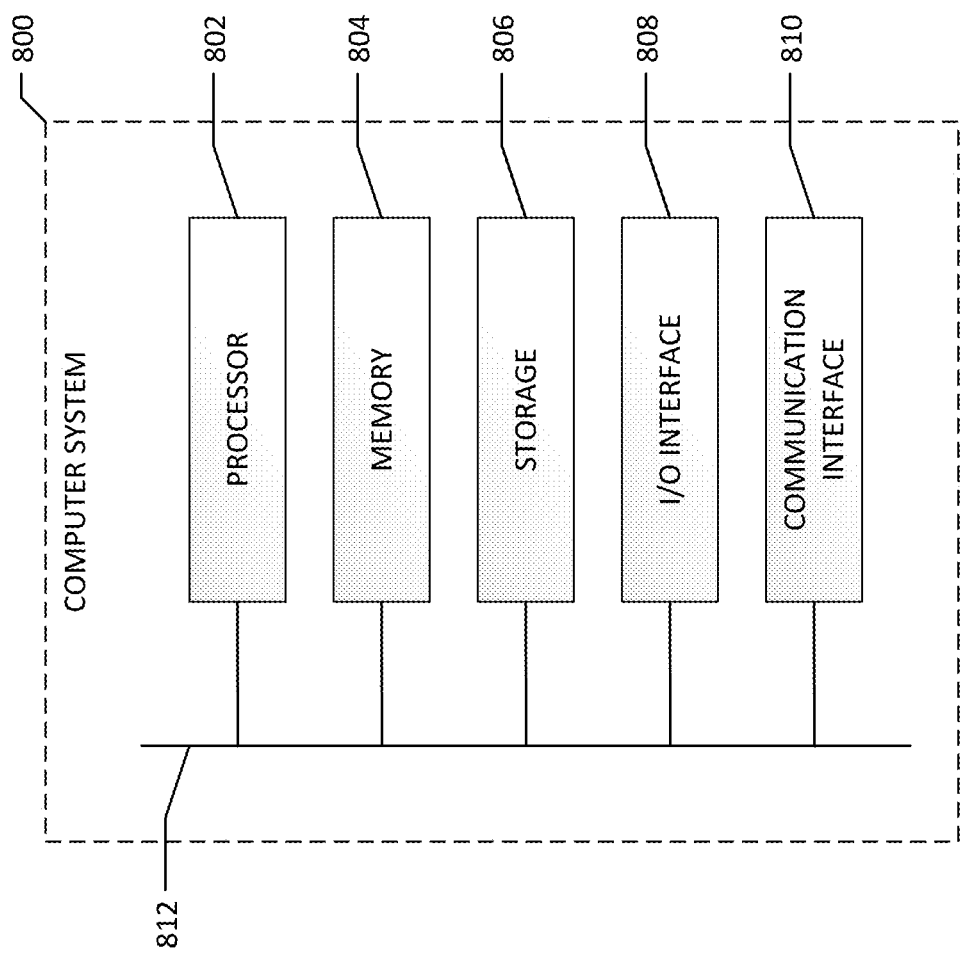
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system associated with a plurality of establishments:

determining a first geographic region and a second geographic region, the second geographic region being smaller than and located within the first geographic region;

identifying a first subset of the plurality of establishments located within the first geographic region and a second subset of the plurality of the establishments located within the second geographic region;

identifying a first set of products available at each of the first subset of establishments and a second set of products available at each of the second subset of establishments, wherein the first set of products and the second set of products include different products;

generating a plurality of first incremental upgrade packages configured to upgrade different versions of product information associated with the first set of products installed on client devices to a first latest version of product information associated with the first set of products, wherein each of the first incremental upgrade packages are stored for distribution to a plurality of client devices;

generating a plurality of second incremental upgrade packages configured to upgrade different versions of product information associated with the second set of products installed on client devices to a second latest version of product information associated with the second set of products, wherein each of the second incremental upgrade packages are stored for distribution to a plurality of client devices;

receiving, from a first client device of the plurality of client devices, a request identifying a first establishment of interest among the plurality of establishments, wherein the first establishment is part of the first subset of establishments and the second subset of establishments;

transmitting, to the first client device, a first identifier identifying the first latest version of product information associated with the first set of products and a second identifier identifying the second latest version of product information associated with the second set of products;

receiving, from the first client device, one or more first download links that identify one or more of the plurality of first incremental upgrade packages, wherein the one or more first download links are generated by the first client device by comparing the first identifier to a first client identifier stored on the first client device which indicates a first existing version of product information associated with the first set of products currently installed on the first client device;

receiving, from the first client device, one or more second download links that identify one or more of the plurality of second incremental upgrade packages, wherein the one or more second download links are generated by the first client device by comparing the second identifier to a second client identifier stored on the first client device which indicates a second existing version of product information associated with the second set of products currently installed on the first client device; and transmitting, to the first client device based on the one or more first and second download links, the identified one or more first incremental upgrade packages and the one or more second incremental upgrade packages, wherein the one or more first and second incremental upgrade packages are configured to upgrade the first existing version of product information associated with the first set of products and the second existing version of product information associated with the second set of products stored on the first client device to the first latest version of product information and the second latest version of product information.

2. The method of claim 1, wherein the first identifier indicates that the first existing version of product information located on the first client device is outdated relative to the first latest version of product information associated with the first set of products.

3. The method of claim 1, further comprising transmitting, to the first client device, an intra-version upgrade package configured to upgrade the first latest version of product information to include informational changes made after the first latest version of product information.

4. The method of claim 1, wherein the one or more first incremental upgrade packages and the one or more second incremental upgrade packages are transmitted to the first client device via a content delivery network (CDN), wherein the transmitted one or more first incremental upgrade packages and the transmitted one or more second incremental upgrade packages are cached by the CDN.

5. One or more computer-readable non-transitory storage media embodying software that is operable when executed to:
   determine a first geographic region and a second geographic region, the second geographic region being smaller than and located within the first geographic region;
   identify a first subset of the plurality of establishments located within the first geographic region and a second subset of the plurality of the establishments located within the second geographic region;
   identify a first set of products available at each of the first subset of establishments and a second set of products available at each of the second subset of establishments, wherein the first set of products and the second set of products include different products;
   generate a plurality of first incremental upgrade packages configured to upgrade different versions of product information associated with the first set of products installed on client devices to a first latest version of product information associated with the first set of products, wherein each of the first incremental upgrade packages are stored for distribution to a plurality of client devices;
   generate a plurality of second incremental upgrade packages configured to upgrade different versions of product information associated with the second set of products installed on client devices to a second latest version of product information associated with the second set of products, wherein each of the second incremental upgrade packages are stored for distribution to a plurality of client devices;
   receive, from a first client device of the plurality of client devices, a request identifying a first establishment of interest among the plurality of establishments, wherein the first establishment is part of the first subset of establishments and the second subset of establishments;
   transmit, to the first client device, a first identifier identifying the first latest version of product information associated with the first set of products and the second identifier identifying a second latest version of product information associated with the second set of products;
   receive, from the first client device, one or more first download links that identify one or more of the plurality of first incremental upgrade packages, wherein the one or more first download links are generated by the first client device by comparing the first identifier to a first client identifier stored on the first client device which indicates a first existing version of product information associated with the first set of products currently installed on the first client device;
   receive, from the first client device, one or more second download links that identify one or more of the plurality of second incremental upgrade packages, wherein the one or more second download links are generated by the first client device by comparing the second identifier to a second client identifier stored on the first client device which indicates a second existing version of product information associated with the second set of products currently installed on the first client device; and
   transmit, to the first client device based on the one or more first and second download links, the identified one or more first incremental upgrade packages and the one or more second incremental upgrade packages, wherein the one or more first and second incremental upgrade packages are configured to upgrade the first existing version of product information associated with the first set of products and the second existing version of product information associated with the second set of products stored on the first client device to the first latest version of product information and the second latest version of product information.

6. The media of claim 5, wherein the first identifier indicates that the first existing version of product information located on the first client device is outdated relative to the first latest version of product information associated with the first set of products.

7. The media of claim 5, wherein the software is further operable when executed to transmit, to the first client device, an intra-version upgrade package configured to upgrade the first latest version of product information to include informational changes made after the first latest version of product information.

8. The media of claim 5, wherein the one or more first incremental upgrade packages and the one or more second incremental upgrade packages are transmitted to the first client device via a content delivery network (CDN), wherein the transmitted one or more first incremental upgrade packages and the transmitted one or more second incremental upgrade packages are cached by the CDN.

9. A system comprising:
one or more processors; and
one or more computer-readable non-transitory storage media coupled to the one or more processors and comprising instructions operable when executed by the one or more processors to cause the system to:
determine a first geographic region and a second geographic region, the second geographic region being smaller than and located within the first geographic region;
identify a first subset of the plurality of establishments located within the first geographic region and a second subset of the plurality of the establishments located within the second geographic region;
identify a first set of products available at each of the first subset of establishments and a second set of products available at each of the second subset of establishments, wherein the first set of products and the second set of products include different products;
generate a plurality of first incremental upgrade packages configured to upgrade different versions of product information associated with the first set of products installed on client devices to a first latest version of product information associated with the first set of products, wherein each of the first incremental upgrade packages are stored for distribution to a plurality of client devices;
generate a plurality of second incremental upgrade packages configured to upgrade different versions of product information associated with the second set of products installed on client devices to a second latest version of product information associated with the second set of products, wherein each of the second incremental upgrade packages are stored for distribution to a plurality of client devices;
receive, from a first client device, a request identifying a first establishment of interest among the plurality of establishments, wherein the first establishment is part of the first subset of establishments and the second subset of establishments;
transmit, to the first client device, a first identifier identifying the first latest version of product information associated with the first set of products and the second identifier identifying a second latest version of product information associated with the second set of products;
receive, from the first client device, one or more first download links that identify one or more of the plurality of first incremental upgrade packages, wherein the one or more first download links are generated by the first client device by comparing the first identifier to a first client identifier stored on the first client device which indicates a first existing version of product information associated with the first set of products currently installed on the first client device;
receive, from the first client device, one or more second download links that identify one or more of the plurality of second incremental upgrade packages, wherein the one or more second download links are generated by the first client device by comparing the second identifier to a second client identifier stored on the first client device which indicates a second existing version of product information associated with the second set of products currently installed on the first client device; and
transmit, to the first client device based on the one or more first and second download links, the identified one or more first incremental upgrade packages and the one or more second incremental upgrade packages, wherein the one or more first and second incremental upgrade packages are configured to upgrade the first existing version of product information associated with the first set of products and the second existing version of product information associated with the second set of products stored on the first client device to the first latest version of product information and the second latest version of product information.

10. The system of claim 9, wherein the first identifier indicates that the first existing version of product information located on the first client device is outdated relative to the first latest version of product information associated with the first set of products.

11. The system of claim 9, wherein the processors are further operable when executing the instructions to transmit to the first client device, an intra-version upgrade package configured to upgrade the first latest version of product information to include informational changes made after the first latest version of product information.

12. The system of claim 9, wherein the one or more first incremental upgrade packages and the one or more second incremental upgrade packages are transmitted to the first client device via a content delivery network (CDN), wherein the transmitted one or more first incremental upgrade packages and the transmitted one or more second incremental upgrade packages are cached by the CDN.

* * * * *